(12) United States Patent
Saito et al.

(10) Patent No.: US 12,038,544 B2
(45) Date of Patent: Jul. 16, 2024

(54) RADIATION IMAGING APPARATUS

(71) Applicant: CANON KABUSHIKI KAISHA, Tokyo (JP)

(72) Inventors: Yohei Saito, Kanagawa (JP); Riku Egawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 17/857,540

(22) Filed: Jul. 5, 2022

(65) Prior Publication Data

US 2023/0011216 A1 Jan. 12, 2023

(30) Foreign Application Priority Data

Jul. 7, 2021 (JP) .................. 2021-112774

(51) Int. Cl.
*G01T 7/00* (2006.01)
*G01T 1/16* (2006.01)
*G01T 1/20* (2006.01)

(52) U.S. Cl.
CPC .................. *G01T 7/00* (2013.01); *G01T 1/16* (2013.01); *G01T 1/20188* (2020.05)

(58) Field of Classification Search
CPC .......... G01T 7/00; G01T 1/20188; G01T 1/16
See application file for complete search history.

(56) References Cited

U.S. PATENT DOCUMENTS

2013/0077762 A1\* 3/2013 Noguchi ................ G03B 42/04
378/189
2014/0252229 A1 9/2014 Kondo
2016/0338655 A1\* 11/2016 Kim ..................... A61B 6/4283

FOREIGN PATENT DOCUMENTS

JP 2018-117083 A 7/2018
WO 2017/145444 A1 8/2017

\* cited by examiner

*Primary Examiner* — Hugh Maupin
(74) *Attorney, Agent, or Firm* — VENABLE LLP

(57) ABSTRACT

A radiation imaging apparatus comprises a housing which encases an image conversion unit for converting radiation into an electrical signal relating to a radiation image, and has at least one opening formed thereon and a housing conductive portion at least a part of which is a conductive portion, a cover member arranged to cover the opening, which is detachably attached to the housing and comprises a cover conductive portion at least a part of which is a conductive portion; and an elastic member provided between the cover member and the housing, wherein the housing conductive portion and the cover conductive portion are pressed into contact by a reaction force of the elastic member.

19 Claims, 6 Drawing Sheets ly to each other are assumed as the X direction and the Y direction. In this case, in FIGS. 1A and 1B, the direction A-A shown in FIG. 1A is the X direction.

RADIATION IMAGING APPARATUS

BACKGROUND OF THE INVENTION

Field of the Invention

The present disclosure relates to a radiation imaging apparatus for performing radiation imaging using radiation. The radiation imaging apparatus is suitable for applying to, for example, a medical image diagnostic apparatus.

Description of the Related Art

A general radiation imaging apparatus (for example, an X-ray apparatus applying X-rays as radiation) is often washed with a liquid such as ethanol every time the image is taken for the purpose of measures against infectious diseases. Therefore, in a radiation imaging apparatus, there is a need for a product having a waterproofing function so that the liquid does not enter the internal electric parts or the like even if washing the apparatus with the liquid. In some radiation imaging apparatuses, the battery can be replaced so that the radiation imaging apparatus cannot take radiation images due to a dead charge or the like in an emergency.

In view of the above, the radiation imaging apparatus proposed in U.S. Patent Application Publication No. 2014/0252229, has both a replacement structure for replacing the battery which is a kind of an internal electric component and a waterproof structure.

For example, the thickness of a portable X-ray imaging apparatus is specified in the standard (JIS Z 4905). In order to realize the structure described in U.S. Patent Application Publication No. 2014/0252229 above in consideration of the thickness defined in this standard, a metal is often used for a cover member forming the battery housing portion because both of thinness and rigidity are required. At this time, if the metal as the conductor is not electrically connected to the component having a large electric capacity, static electricity may flow to the internal electric component through the cover member when static electricity is generated, and the internal electric component may be destroyed.

SUMMARY OF THE INVENTION

It is an object of the present disclosure to provide a mechanism which can be realized by a simple structure with a small number of components when preventing the breakage of internal electric components due to static electricity and ensuring waterproofness.

The radiation imaging apparatus for achieving the above object, comprises: an image conversion unit configured to convert radiation into an electrical signal relating to a radiation image; a housing arrange to encase the image conversion unit, on which at least one opening is formed and comprising a housing conductive portion at least a part of which is a conductive portion; a cover member arranged to cover the opening, which is detachably attached to the housing and comprising a cover conductive portion at least a part of which is a conductive portion; and an elastic member provided between the cover member and the housing, wherein the housing conductive portion and the cover conductive portion are pressed into contact by a reaction force of the elastic member.

Further features of the present disclosure will become apparent from the following description of exemplary embodiments with reference to the attached drawings.

DESCRIPTION OF THE EMBODIMENTS

Aspects of the present disclosure (embodiments) will now be described with reference to the drawings. In the embodiments of the present disclosure described below, an example in which X-ray is applied as radiation in the present disclosure will be described, but the present disclosure is not limited to X-ray, and other radiation such as α-ray, β-ray and γ-ray can also be applied.

First Embodiment

Firstly, a first embodiment of the present disclosure will be described with reference to FIGS. 1A to 3B.

Figure 1A:
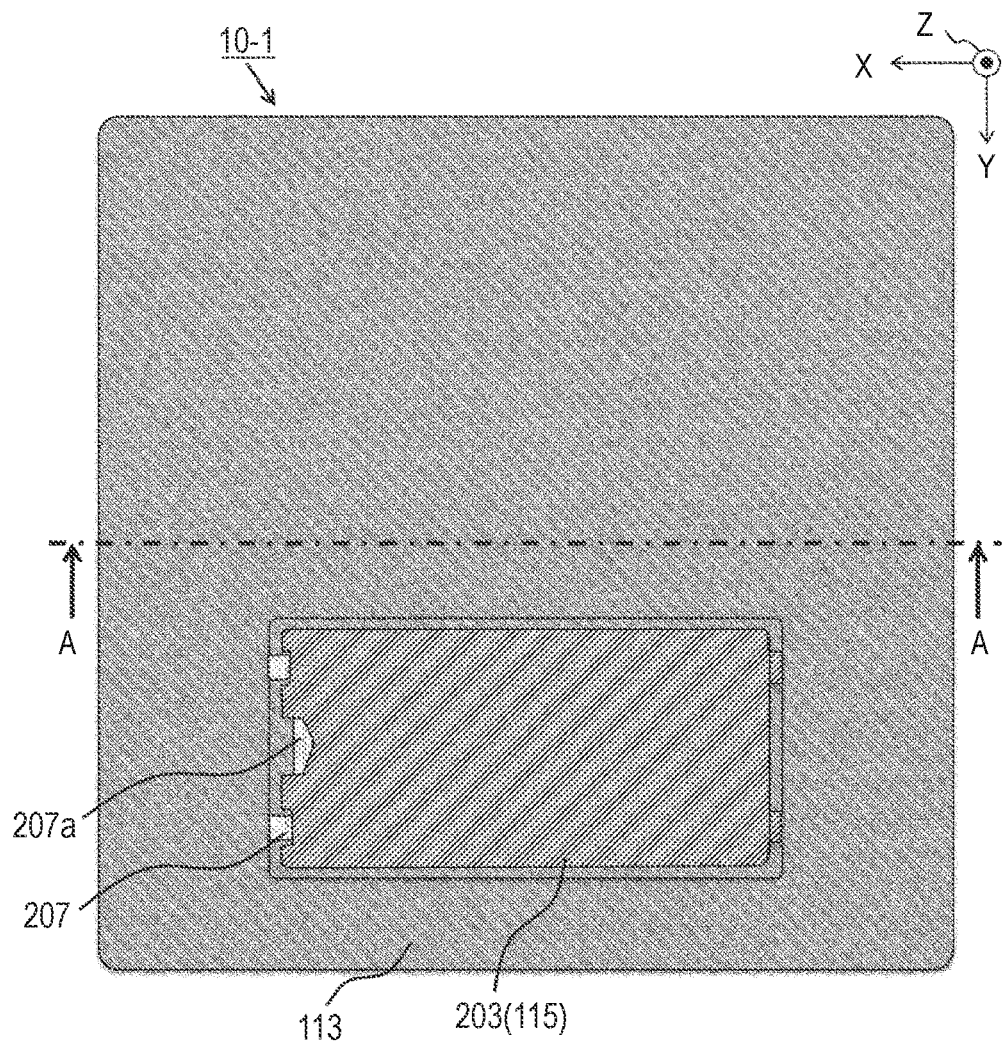
FIGS. 1A and 1B are diagrams showing an example of a schematic configuration of a radiation imaging apparatus according to a first embodiment of the present disclosure.
Figure 1B:
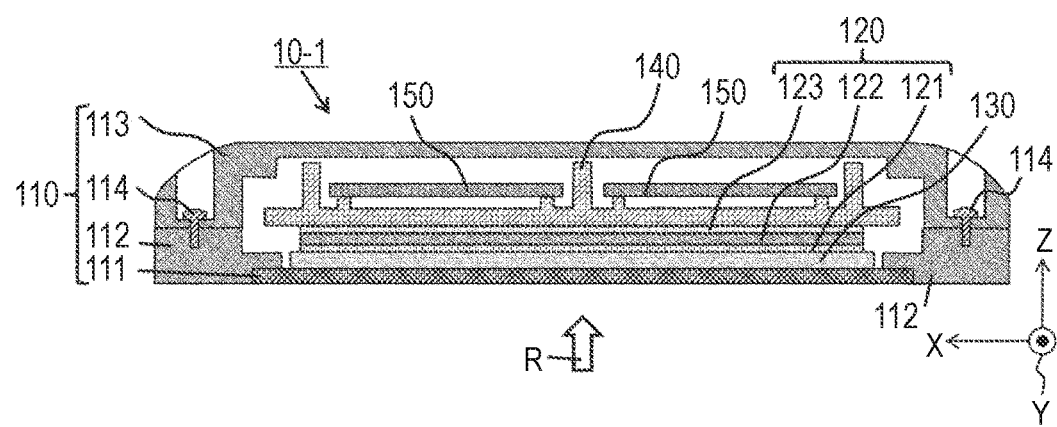

FIGS. 1A and 1B are diagrams showing an example of a schematic configuration of a radiation imaging apparatus 10-1 according to a first embodiment of the present disclosure. Specifically, FIG. 1A is an external view of the radiation imaging apparatus 10-1 as seen from a side of a rear side housing part 113 which is disposed at a position facing an incident surface part 111 on which the radiation R shown in FIG. 1B enters. FIG. 1B shows an example of the internal configuration of the radiation imaging apparatus 10-1 in the A-A cross section shown in FIG. 1A.

FIGS. 1A and 1B illustrate an XYZ coordinate system in which the incident direction of the radiation R shown in FIG. 1B is assumed as the Z direction, and two directions orthogonal to the Z direction and orthogonal to each other are assumed as the X direction and the Y direction. In this case, in FIGS. 1A and 1B, the direction A-A shown in FIG. 1A is the X direction.

As shown in FIG. 1B, the radiation imaging apparatus 10-1 includes a housing 110, an image converting unit 120, an impact absorbing member 130, a base 140, and an electric substrate 150.

As shown in FIG. 1B, the housing 110 includes an incident surface part 111, a front side frame part 112, a rear side housing part 113, and a fastening member 114. The housing 110 has at least partially a conductive portion.

The incident surface part 111 is arranged as an incident surface plate of the housing 110 on which radiation R such as X-rays (including radiation transmitted through a subject not shown) is incident. The incident surface part 111 is formed of, for example, CFRP (Carbon Fiber Reinforced Plastic) having low absorption of radiation R such as X-rays and high rigidity. The incident surface part 111 is fixed to the front side frame part 112 by adhesion.

The front side frame part 112 is located on a side surface of the housing 110, is fixed to the incident surface part 111 by adhesion, and is fixed to the rear side housing part 113 by a fastening member 114 such as a screw. The front side frame part 112 is formed of a metal such as a magnesium alloy or an aluminum alloy, for example.

The rear side housing part 113 is configured to face the side surface of the housing 110 and the incident surface part 111. The rear side housing part 113 is formed of a metal such as a magnesium alloy or an aluminum alloy. As shown in FIG. 1A, an opening 115 is formed in the rear side housing part 113.

The radiation imaging apparatus 10-1 further includes a cover member 203 which is a cover member arranged to cover the opening 115. At least a part of the cover member 203 has a conductive portion. As shown in FIG. 1A, an end portion of the cover member 203 is provided with a lock unit 207 for locking the cover member 203 so as to be mounted on the rear side housing part 113. Further, the lock unit 207 is integrally provided with an operation portion 207a, and the cover member 203 can be removed from the rear side housing part 113 by sliding the operation portion 207a inward of the rear side housing part 113.

The fastening member 114 is a member such as a screw for fastening the rear side housing part 113 to the front side frame part 112. At this time, for example, a gasket (not shown) is sandwiched at the fixing portion between the front side frame part 112 and the rear side housing part 113, to form a sealed space inside the housing 110 by the incident surface part 111, the front side frame part 112 and the rear side housing part 113. An image conversion unit 120, an impact absorbing member 130, a base 140, and an electric substrate 150 are arranged at predetermined positions in the sealed space inside the housing 110. That is, the housing 110 includes the image conversion unit 120, the impact absorbing member 130, the base 140, and the electric substrate 150 at predetermined positions.

The image conversion unit 120 is a component that converts the incident radiation R into an electric signal related to a radiation image. As shown in FIG. 1B, the image conversion unit 120 includes a phosphor (scintillator) 121, a sensor panel 122, and a shielding material 123. The phosphor 121 is a component for converting the incident radiation R into a light, and is formed of, for example, GOS or CsI. The sensor panel 122 is a component for converting the light generated by the phosphor 121 into the electric signal related to the radiation image. The shielding material 123 is a component provided for reducing the influence of the scattered rays of the radiation R passing through the sensor panel 122 on the radiation image and the influence on the electric substrate 150. The image conversion unit 120 enables the radiation imaging apparatus 10-1 to acquire the radiation image.

The impact absorbing member 130 is disposed between the incident surface part 111 of the housing 110 and the image conversion unit 120. The impact absorbing member 130 is a component which absorbs an external impact for the housing 110 and protects the image conversion unit 120, the base 140, the electric substrate 150 and the like inside the housing 110, when the housing 110 receives the external impact.

The base 140 holds the image conversion unit 120 and receives a load from the outside.

The electric substrate 150 is attached to the side of the base 140 opposite to the side of the incident surface part 111, and is a component that electrically drives the image conversion unit 120.

Figure 2A:
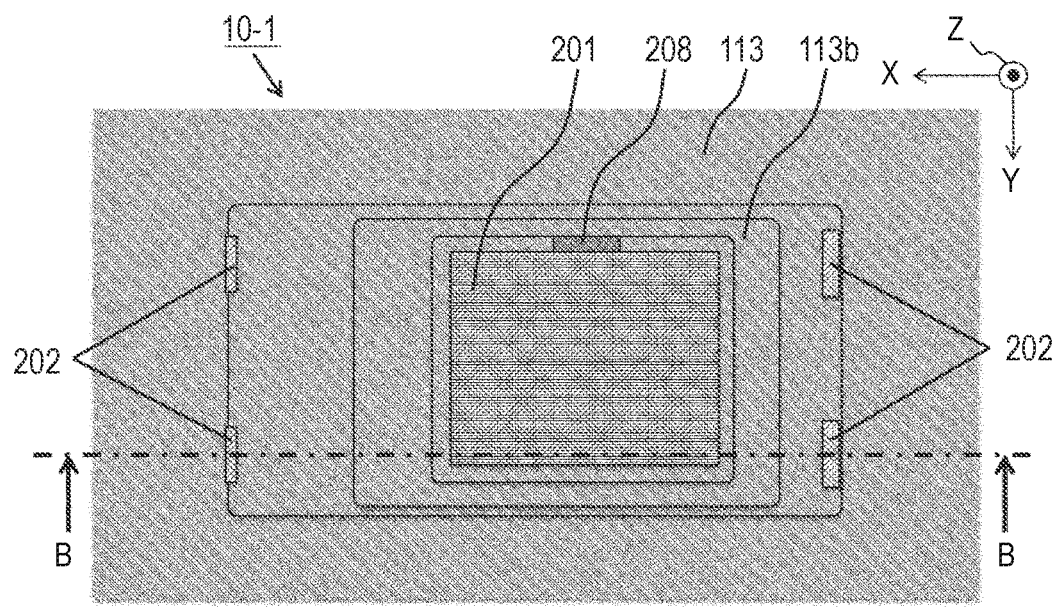
FIGS. 2A and 2B show the radiation imaging apparatus according to the first embodiment of the present disclosure, and are views for explaining an example of a method of attaching the cover member shown in FIG. 1A.
Figure 2B:
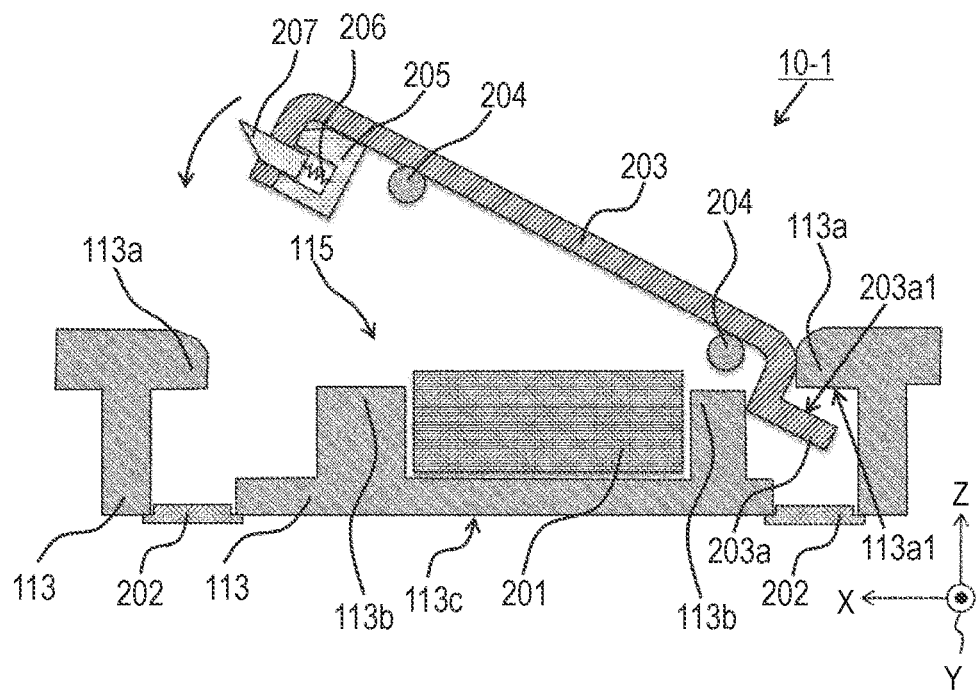

FIGS. 2A and 2B show the radiation imaging apparatus 10-1 according to the first embodiment of the present disclosure, and are views for explaining an example of a method of mounting the cover member 203 shown in FIG. 1A. Specifically, FIG. 2A is an enlarged view of the appearance of the periphery of the cover member, when viewed from the rear side housing part 113 in a state that the cover member 203 shown in FIG. 1A is removed from the radiation imaging apparatus 10-1. FIG. 2B is a view for explaining how the cover member 203 is attached to the B-B cross section shown in FIG. 2A in the peripheral region of the rear side housing part 113. FIGS. 2A and 2B show an XYZ coordinate system corresponding to the XYZ coordinate system shown in FIGS. 1A and 1B. Hereinafter, with reference to FIGS. 2A and 2B, a structure relating to the waterproof property of the rear side housing part 113 for mainly holding the battery 201 will be described. In FIGS. 2A and 2B, elements similar to those shown in FIGS. 1A and 1B are denoted by the same reference numerals, and a detailed description thereof will be omitted.

As shown in FIGS. 2A and 2B, the radiation imaging apparatus 10-1 further includes a battery 201, a rubber member 202, a packing 204, a lock holding unit 205, a lock biasing spring 206, and a terminal 208 in addition to the cover member 203 and the lock unit 207 shown in FIG. 1A. Here, the cover member 203 is formed of a metal such as an aluminum alloy, for example.

The battery 201 is an electric component that supplies electric power to the electric substrate 150 shown in FIG. 1B through the terminal 208 shown in FIG. 2A, and enables the electric substrate 150 to electrically drive the image conversion unit 120.

The rear side housing part 113 includes a battery holding housing part 113c having a recessed portion for holding the battery 201 (a concave shape capable of holding the battery 201), and a hook portion 113a for holding the cover member 203 so as not to come off. In FIG. 2B, protruded regions at both ends of the recessed portion of the battery holding housing part 113c are shown as waterproof regions 113b. An opening is required on the rear side housing part 113 to form a shape of hook portion 113a, and a rubber member 202 is inserted into the opening to plug it, so as to prevent the inside of the housing 110 from entering of the water.

The packing 204 is an elastic member which is adhered or adhered by a double-sided tape to a cover member 203 formed of a metal such as an aluminum alloy. In such a configuration, the packing 204 as the elastic member can be easily replaced even when it is deformed by repeated loads when the cover member 203 is attached to and detached from the rear side housing part 113.

At one end of the cover member 203, a pawl portion 203a for hooking the hook portion 113a of the rear side housing part 113 is provided. FIG. 2B illustrates a lower surface 113a1 of the hook portion 113a and an upper surface 203a1 of the pawl portion 203a. A lock holding unit 205, a lock biasing spring 206, and a lock unit 207 are integrally formed at the other end of the cover member 203 opposite to the one end. In the present embodiment, the lock holding unit 205, the lock biasing spring 206, and the lock unit 207 constitute a "lock mechanism" which locks the cover member 203 so as to be mounted on the rear side housing part 113 by contacting the rear side housing part 113. Specifically, the lock holding unit 205 is a resin-made structural unit fixed to the cover member 203 by screws (not shown). The lock biasing spring 206 is a spring for pressing the lock unit 207 made of resin, for example, in the outward direction of the cover member 203.

The cover member 203 is attached to the rear side housing part 113 while being rotated in the arrow direction shown in FIG. 2B. Specifically, when the cover member 203 is rotated in the arrow direction shown in FIG. 2B, the lock unit 207 receives a force from the rear side housing part 113, and moves in the inner direction of the cover member 203 while pressing and contracting the lock biasing spring 206. When the lock unit 207 reaches the lower side (−Z side) of the hook portion 113a, the lock unit 207 is pressed to the outside of the cover member 203 by the lock biasing spring 206. As a result, the cover member 203 is attached (mounted) to the rear side housing part 113.

In the locked state by the lock unit 207, the packing 204, which is an elastic member, is sandwiched between the cover member 203 and the battery holding housing part 113c and crushed, so that the sealing of the housing 110 can be maintained. In the locked state by the lock unit 207, the packing 204 as an elastic member is crushed, so that waterproofness can be ensured of the battery holding housing part 113c through the waterproofing region 113b, in the rear side housing part 113. As a result, it is possible to prevent the battery 201 and the electric connection portion of the terminal 208 connecting the battery 201 and the electric substrate 150 from infiltration of water.

Figure 3A:
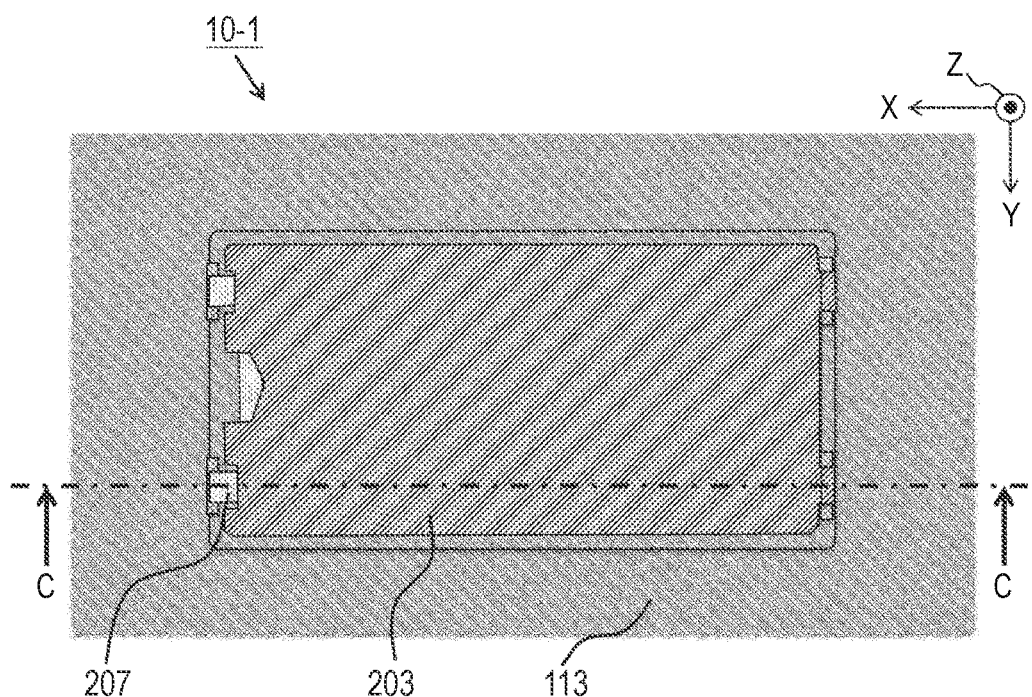
FIGS. 3A and 3B show the radiation imaging apparatus according to the first embodiment of the present disclosure, and shows a state after a cover member is attached to a rear housing portion.
Figure 3B:
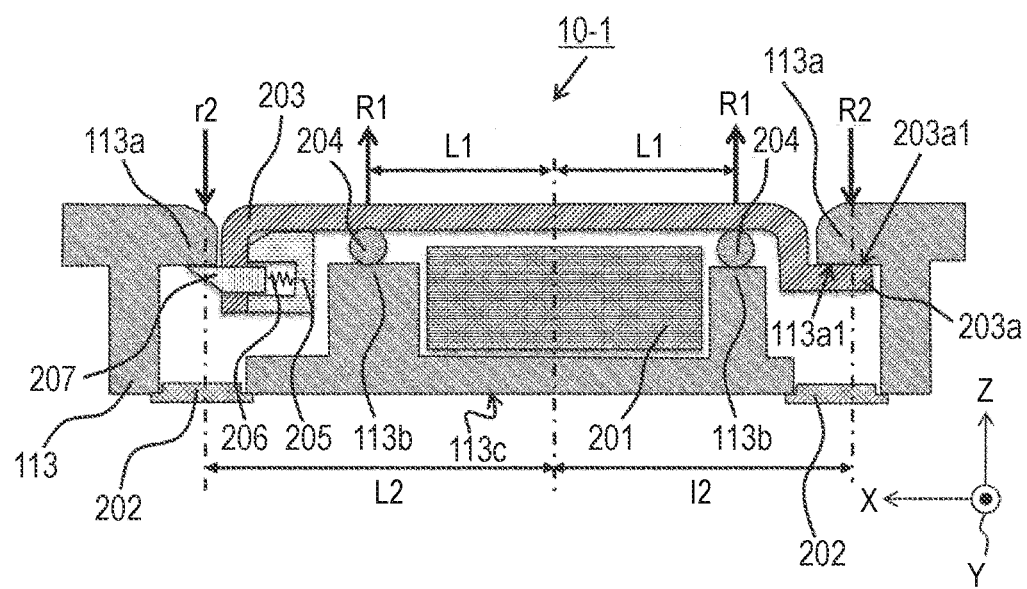

FIGS. 3A and 3B show the radiation imaging apparatus 10-1 according to the first embodiment of the present disclosure, and shows the state after the cover member 203 is attached to the rear side housing part 113. Specifically, FIG. 3A is an enlarged view of the appearance of the periphery of the cover member 203 when the cover member 203 is attached to the rear side housing part 113 in the radiation imaging apparatus 10-1 as viewed from the rear side housing part 113. FIG. 3B is a view showing an example of the internal structure in the C-C cross section shown in FIG. 3A in the peripheral region of the rear side housing part 113. FIGS. 3A and 3B show an XYZ coordinate system corresponding to the XYZ coordinate system shown in FIGS. 1A to 2B. Hereinafter, with reference to FIGS. 3A and 3B, a structure relating to the conductivity between the rear side housing part 113 and the cover member 203 for mainly holding the battery 201 will be described. In FIGS. 3A and 3B, elements similar to those shown in FIGS. 1A to 2B are denoted by the same reference numerals, and a detailed description thereof is omitted.

Although the cover member 203 is coated with insulating material because it is an external appearance element, at least the upper surface 203a1 of the pawl portion 203a is an uncoated portion and exposes metal. Therefore, at least the upper surface 203a1 of the pawl portion 203a of the cover member 203 is a portion corresponding to a "cover conductive portion" which is a conductive portion. Similarly, although the rear side housing part 113 is coated because it is an external appearance element, at least the lower surface 113a1 of the hook portion 113a is an uncoated portion and exposes metal. For this reason, at least the lower surface 113a1 of the hook portion 113a of the rear side housing part 113 is a portion corresponding to a "housing conductive portion" which is a conductive portion.

In the state after the cover member 203 is attached to the rear side housing part 113, the packing 204, which is an elastic member, is pressed between the cover member 203 and the battery holding housing part 113c and crashed in order to ensure waterproofness. Therefore, the cover member 203 receives the reaction force corresponding to the force required to crush the packing 204 in the upward direction (+Z direction), and the rear side housing part 113 receives the reaction force in the downward direction (−Z direction). In FIG. 3B, the reaction force of the packing 204 received by the cover member 203 is shown as the reaction force R1, and the reaction force of the packing 204 received by the rear side housing part 113 (more specifically, the hook portion 113a) is shown as the reaction forces r2 and R2. At this time, the reaction force of the packing 204 received by the hook portion 113a in contact with the lock portion 207 is defined as the reaction force r2, and the reaction force of the packing 204 received by the hook portion 113a in contact with the pawl portion 203a of the cover member 203 is defined as the reaction force R2. Then, due to the reaction force of the packing 204 described here, the upper surface 203a1 of the pawl portion 203a, which is the cover conductive portion, and the lower surface 113a1 of the hook portion 113a, which is the housing conductive portion, are pressed into contact with each other, thereby obtaining stable conductivity.

In the radiation imaging apparatus 10-1 of the present embodiment, the distance 12 from the center position of the reaction forces R1 of the packing 204 received by the cover member 203 to the pawl portion 203a (the position at which the reaction force R2 applies) is shorter than the distance L2 from the center position to the lock portion 207 (the position at which the reaction force r2 applies). Similarly, the distance from the upper surface 203a1 (the position at which the reaction force R2 applies) of the pawl portion 203a to the packing 204 at the right side in FIG. 3B (the position at which the reaction force R1 applies) is shorter than the distance from the position of the lock portion 207 in contact with the rear side housing part 113 (the position at which the reaction force r2 applies) to the packing 204 at the left side in FIG. 3B (the position at which the reaction force R1 applies). In this case, since the reaction force R2 on the pawl portion 203a side is larger than the reaction force r2 on the lock portion 207 side, by influence of the balance of the moments, the load on the pawl portion 203a side which is the conductive portion side becomes larger, and the conductivity between the conduction portions can be stabilized.

In the present embodiment, the housing 110 includes an external appearance housing part (at least a part excluding the battery holding housing part 113c) having an external appearance surface (an exterior surface) and a hook portion 113a serving as the housing conductive portion, and a battery holding housing part 113c having the recessed portion capable of holding the battery 201 therein. At this time, the battery holding housing part 113c is disposed so as to be fixed integrally with the above described external appearance housing part. In the present embodiment, the packing 204 serving as the elastic member is interposed between the cover member 203 and the battery holding housing part 113c.

It is conceivable to electrically connect the cover member to a housing having a larger electric capacity through a plurality of parts such as a conductive tape by pressing a metal body to the cover member with a spring or the like, but in this case, the number of parts becomes large and the structure becomes complicated. In the radiation imaging apparatus 10-1 according to the first embodiment described above, the lower surface 113a1 of the hook portion 113a, which is a housing conductive portion, and the upper surface 203a1 of the pawl portion 203a, which is a cover conductive portion, are pressed into contact by the reaction force of the packing 204, which is the elastic member. According to this configuration, there is no need for dedicated parts for conducting the housing 110 and the cover member 203 (the number of parts for conducting can be reduced), and since the reaction force of the packing 204 improves the contact between the housing conductive portion and the cover conductive portion, stable conductivity can be obtained. Thus, for example, even if the cover member 203 receives static electricity, the static electricity is transmitted to the rear side housing part 113 side, so that the battery 201, the electric substrate 150, and the like, which are internal electric components, can be protected from static electricity. That is, according to the radiation imaging apparatus 10-1 according to the first embodiment, when the internal electric parts are prevented from being broken by static electricity and waterproof property is ensured, it is possible to realize a simple structure with a small number of parts.

In the present embodiment, as an object to be covered by the cover member 203 configured detachably attached to the housing 110, the battery holding housing part 113c having a recessed portion capable of holding the battery 201 therein has been described, but the present disclosure is not limited to this embodiment. In the present disclosure, as long as the cover member 203 is detachably attached to the housing 110, it is applicable to cover any object.

Second Embodiment

Next, a second embodiment of the present disclosure will be described with reference to FIGS. 4A to 5B. In the description of the second embodiment described below, elements common to the first embodiment described above will be omitted, and elements different from the first embodiment described above will be described.

Figure 4A:
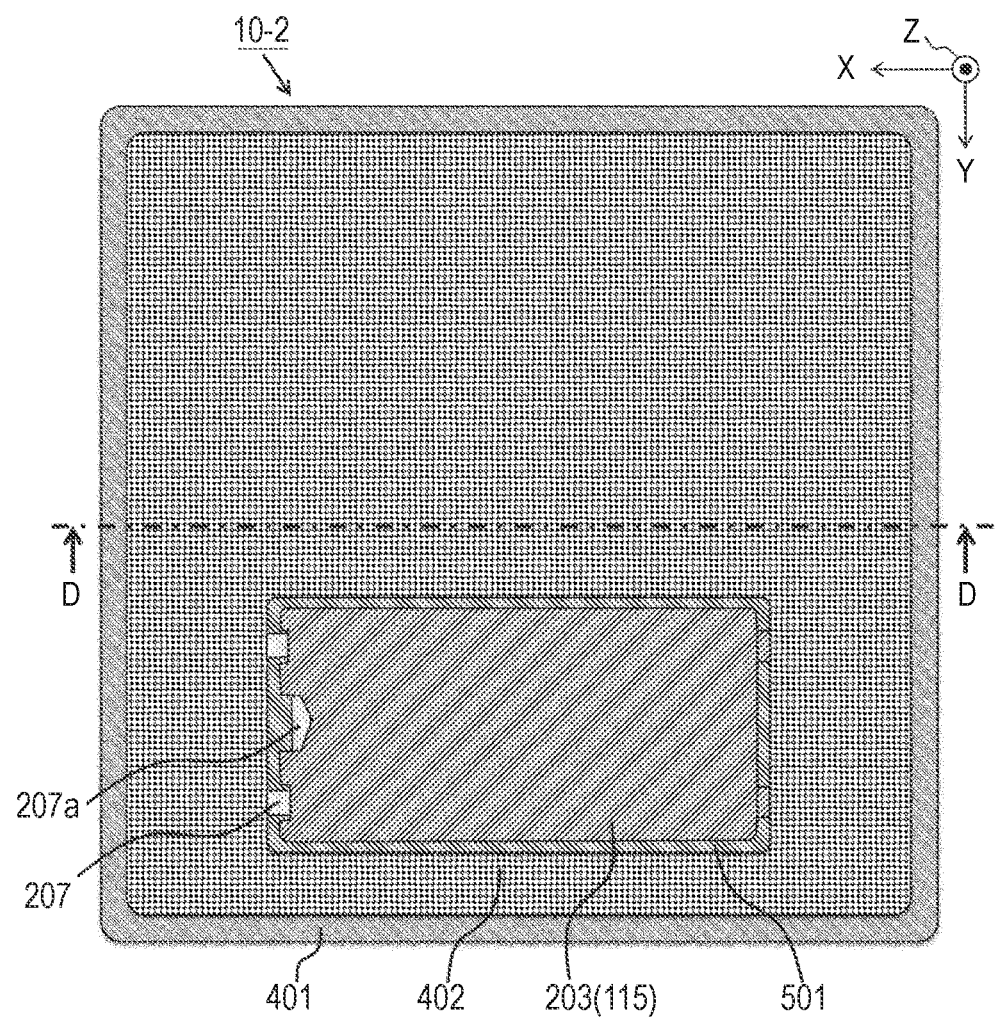
FIGS. 4A and 4B are diagrams showing an example of a schematic configuration of a radiation imaging apparatus according to a second embodiment of the present disclosure.
Figure 4B:
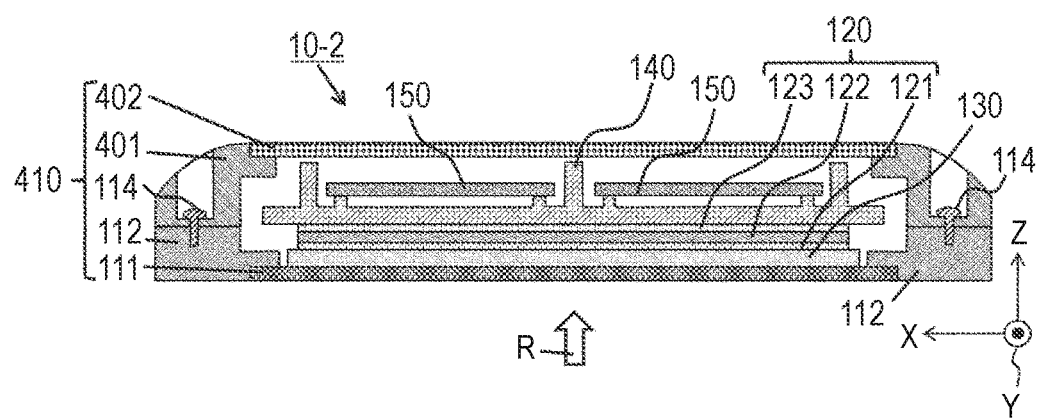

FIGS. 4A and 4B are diagrams showing an example of a schematic configuration of a radiation imaging apparatus 10-2 according to a second embodiment of the present disclosure. Specifically, FIG. 4A is an external view of the radiation imaging apparatus 10-2 as seen from the rear housing part 402, which is disposed at a position facing the incident surface part 111 on which the radiation R shown in FIG. 4B enters. FIG. 4B shows an example of the internal configuration of the radiation imaging apparatus 10-2 in the D-D cross section shown in FIG. 4A. FIGS. 4A and 4B illustrate an XYZ coordinate system corresponding to the XYZ coordinate system shown in FIGS. 1A to 3B. In FIG. 4, elements similar to those shown in FIGS. 1A to 3B are denoted by the same reference numerals, and a detailed description thereof is omitted.

In the radiation imaging apparatus 10-2 according to the second embodiment, the housing 410 includes a rear side frame part 401, a rear side part 402, and a battery holding member 501 in addition to the incident surface part 111, the front side frame part 112, and the fastening member 114 described in the first embodiment. That is, the housing 410 in the second embodiment shown in FIGS. 4A and 4B is provided with the rear side frame part 401, the rear side part 402, and the battery holding member 501 shown in FIGS. 4A and 4B in place of the rear side housing part 113 of the housing 110 in the first embodiment shown in FIGS. 1A and 1B.

The rear side frame part 401 is formed on the side surface of the housing 410, and is fastened to the front side frame part 112 by a fastening member 114. The rear side frame part 401 is formed of, for example, a metal such as a magnesium alloy or an aluminum alloy.

The rear side part 402 is a rear surface plate configured at a position opposed to the incident surface part 111 in the housing 110. The rear side part 402 is fixed to the rear side frame part 401 by adhesion. The rear side part 402 is formed of, for example, CFRP, which has a highly rigid and can produce thin three-dimensional shape (three-dimensional structure).

As described above, the front side frame part 112 and the rear side frame part 401 are connected and fixed by the fastening member 114. At this time, for example, a gasket (not shown) is sandwiched at the fixing portion between the front side frame part 112 and the rear side frame part 401, to form a sealed space inside the housing 410 by the incident surface part 111, the front side frame part 112, the rear side frame part 401, and the rear side part 402.

Figure 5A:
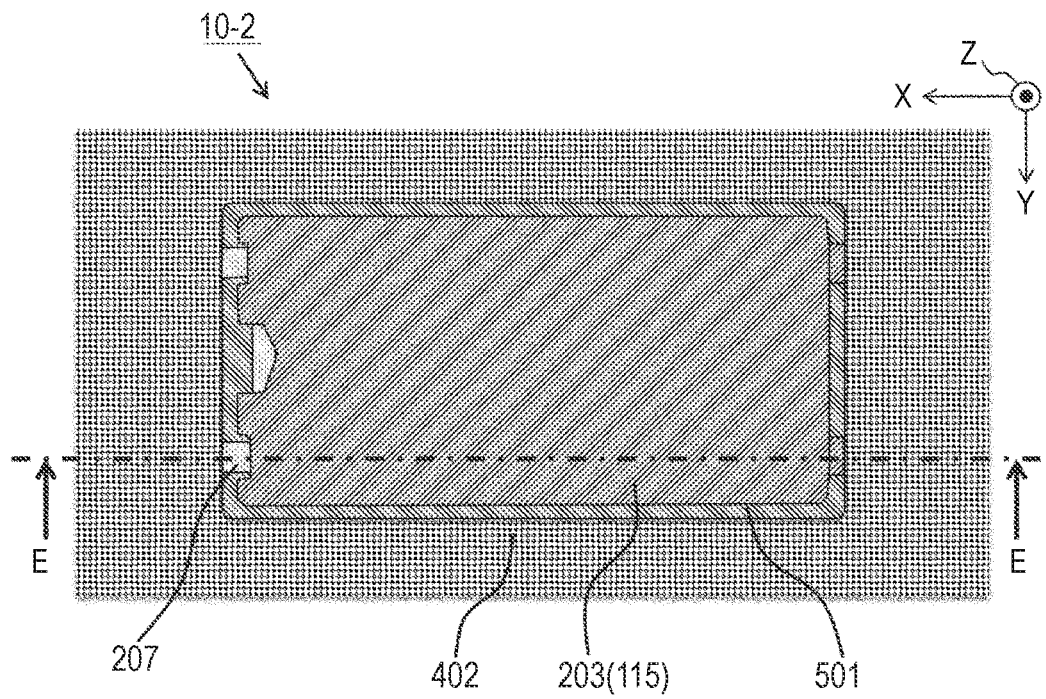
FIGS. 5A and 5B are diagrams showing an example of a schematic configuration of a radiation imaging apparatus according to a second embodiment of the present disclosure.
Figure 5B:
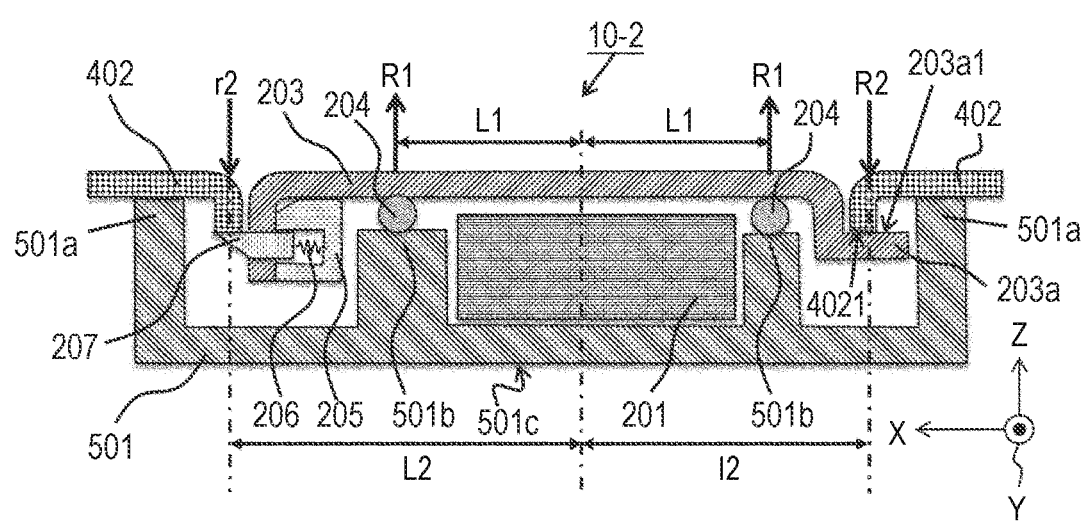

FIGS. 5A and 5B are diagrams showing an example of a schematic configuration of a radiation imaging apparatus 10-2 according to a second embodiment of the present disclosure. Specifically, FIG. 5A is an enlarged view of the appearance of the periphery of the cover member 203 as seen from the rear side part 402 of the radiation imaging apparatus 10-2. FIG. 5B shows an example of the internal configuration of the radiation imaging apparatus 10-2 in the E-E cross section shown in FIG. 5A. FIGS. 5A and 5B illustrate an XYZ coordinate system corresponding to the XYZ coordinate system shown in FIGS. 1A to 4B. Referring now to FIGS. 5A and 5B, a structure relating to the waterproof property of the battery holding member 501 which mainly holds the battery 201 and a structure relating to the conductivity between the rear side part 402 and the cover member 203 will be described. In FIGS. 5A and 5B, elements similar to those shown in FIGS. 1A to 4B are denoted by the same reference numerals, and a detailed description thereof is omitted.

The battery holding member 501 is provided with a battery holding housing part 501c having a recessed portion (a concave shape capable of holding the battery 201) for holding the battery 201, and in FIG. 5B, protruded regions at both ends of the recessed portion are illustrated as waterproof regions 501b. The battery holding housing part 501c shown in FIG. 5B is a part corresponding to the battery holding housing part 113c in the first embodiment shown in FIG. 3B. The battery holding member 501 also includes a protruded region 501a in contact with the rear side part 402.

The battery holding member 501 is fixed to the rear side part 402 by adhering with an adhesive or the like, and closes the openings other than the terminals 208, and is handled as an integral rear side housing.

Further, as shown in FIG. 5B, the rear side part 402 serves as a vertical wall portion in a three-dimensional structure in which the end portion 4021 extends in the direction toward the incident surface part 111 (−Z direction). The pawl portion 203a of the cover member 203 and the lock unit 207 can be restrained by the end portion 4021 of the rear side part 402, thereby ensuring waterproofness when the cover member 203 is mounted on the housing 410. As described above, the rear side part 402 which is one element of the housing 410 is formed of CFRP and has a three-dimensional structure. Here, since the CFRP is a material of which the shape is prevented from being deformed by applying an epoxy resin or the like on the outside of the carbon fiber woven sheet, the carbon fiber in the CFRP is easy to conduct electricity (conductive) and the epoxy resin on the surface is hard to conduct electricity. At this time, as shown in FIG. 5B, in the rear side part 402, the pawl portion 203a of the cover member 203 and the end portion 4021 for holding the lock unit 207 are exposed to the internal carbon fibers of CFRP and have a property of easily flowing electricity. That is, the end portion 4021 of the rear side part 402 corresponds to the "housing conductive part" described in the first embodiment.

Since at least the upper surface 203a1 of the pawl portion 203a of the cover member 203 corresponds to the "cover conductive part" described in the first embodiment, an appropriate conductivity between the upper surface 203a1 of the pawl portion 203a and the end portion 4021 of the rear side part 402 can be obtained.

As in the first embodiment, the cover member 203 receives a reaction force corresponding to a force for crushing the packing 204 in an upward direction (+Z direction), and the rear side part 402 receives a reaction force in a downward direction (−Z direction). In FIG. 5B, the reaction force of the packing 204 received by the cover member 203 is shown as the reaction force R1, and the reaction force of the packing 204 received by the rear side part 402 is shown as the reaction forces r2 and R2. The reaction forces R1, r2 and R2 shown in FIG. 5B can be considered to be the same as the reaction forces R1, r2 and R2 shown in FIG. 3B described in the first embodiment. Then, due to the reaction force of the packing 204 described here, the upper surface 203a1 of the pawl portion 203a, which is the cover conductive portion, and the end portion 4021 of the rear side part 402, which is the housing conductive portion, are pressed into contact with each other, thereby obtaining stable conductivity.

In the radiation imaging apparatus 10-2 of the present embodiment, the distance 12 from the center position of the reaction forces R1 of the packing 204 received by the cover member 203 to the pawl portion 203a (the position at which the reaction force R2 applies) is shorter than the distance L2 from the center position to the lock portion 207 (the position at which the reaction force r2 applies). Similarly, the distance from the upper surface 203a1 (the position at which the reaction force R2 applies) of the pawl portion 203a to the packing 204 at the right side in FIG. 5B (the position at which the reaction force R1 applies) is shorter than the distance from the position of the lock portion 207 in contact with the rear side part 402 (the position at which the reaction force r2 applies) to the packing 204 at the left side in FIG. 5B (the position at which the reaction force R1 applies). In this case, since the reaction force R2 on the pawl portion 203a side is larger than the reaction force r2 on the lock portion 207 side, by influence of the balance of the moments, the load on the pawl portion 203a side which is the conduction portion side becomes larger, and the conductivity between the conduction portions can be stabilized.

In the present embodiment, even if the rear side part 402 is formed by using a CFRP which is thin and moldable and has high rigidity but is difficult to obtain electric conductivity on the surface, the end portion 4021 where the carbon fiber is exposed is used as a conductive portion, thereby achieving both good electric conductive performance and waterproof performance, and further reducing the weight.

In the present embodiment, both the lock holding unit 205 and the lock portion 207, which constitute a lock mechanism, may be formed of a metal such as aluminum (that is, the conductor). In this case, the cover member 203, the lock holding unit 205, and the lock portion 207 are all electrically connected by making the contact portion of the cover member 203 contacting with the lock holding portion 205 so as not to be coated. Therefore, since the conductive portion can be secured not only on the pawl portion 203a side of the cover member 203 but also on the lock mechanism side, the the number of the conductive portions is increased, so that more stable conductivity can be obtained. The lock mechanism according to the present embodiment is also applicable to the metal housing described in the first embodiment.

In the radiation imaging apparatus 10-2 according to the second embodiment, the end portion 4021 of the rear side part 402, which is the housing conductive portion, and the upper surface 203a1 of the pawl portion 203a, which is the cover conductive portion, are pressed into contact by the reaction force of the packing 204, which is the elastic member. According to this configuration, as in the first embodiment, it is possible to realize a simple structure with a small number of parts when preventing the breakage of the internal electric parts due to static electricity and ensuring waterproofness.

Third Embodiment

Next, a third embodiment of the present disclosure will be described with reference to FIGS. 6A and 6B. In the description of the third embodiment described below, elements common to the first and second embodiments described above will be omitted, and elements different from the first and second embodiments described above will be described.

Figure 6A:
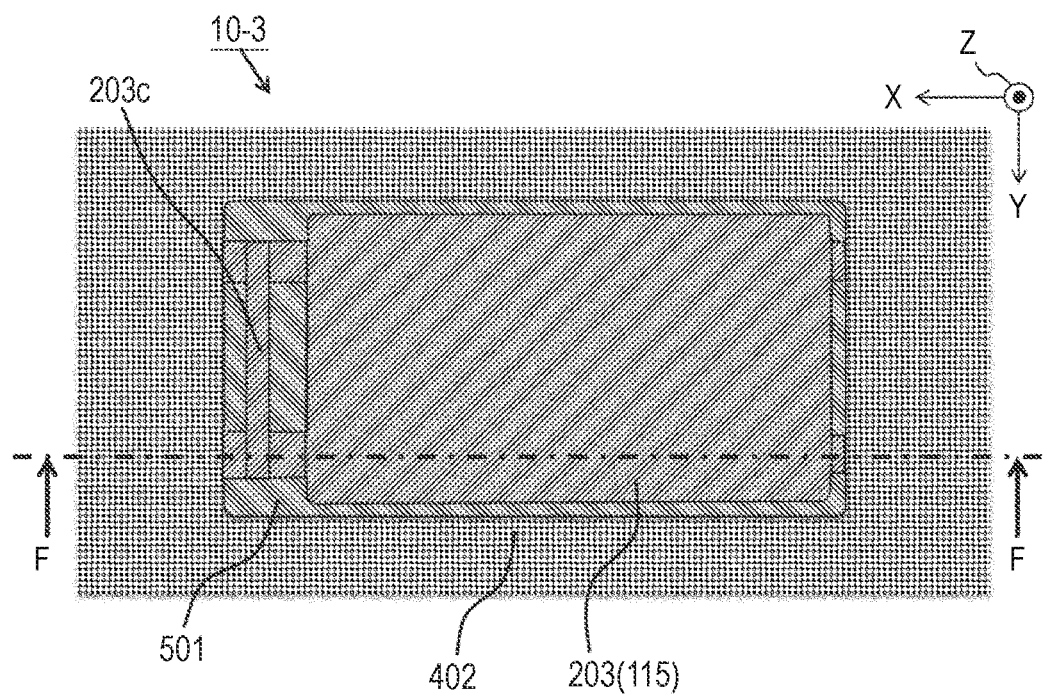
FIGS. 6A and 6B are diagrams showing an example of a schematic configuration of a radiation imaging apparatus according to a third embodiment of the present disclosure.
Figure 6B:
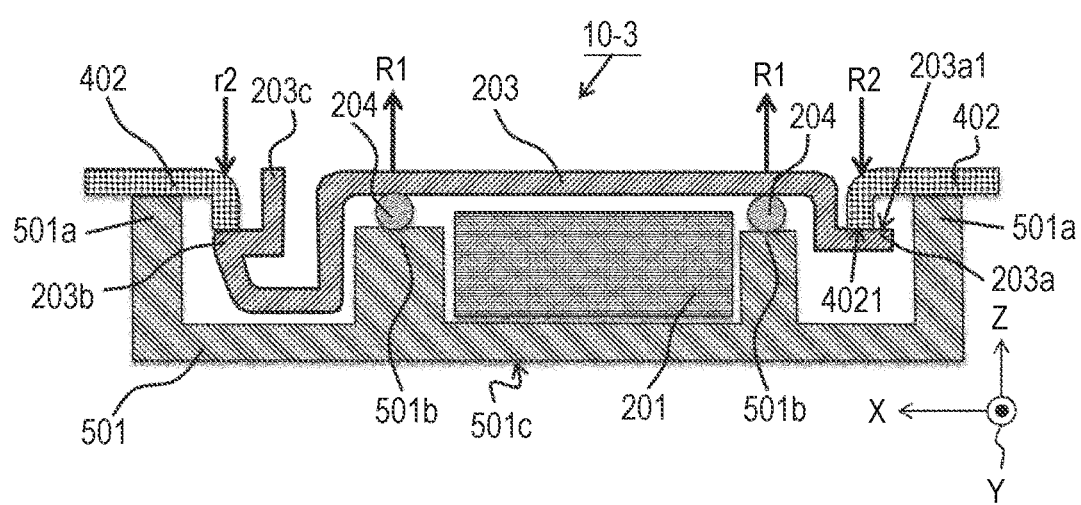

FIGS. 6A and 6B are diagrams showing an example of a schematic configuration of a radiation imaging apparatus 10-3 according to a third embodiment of the present disclosure. Specifically, FIG. 6A is an enlarged view of the appearance of the periphery of the cover member 203 as seen from the rear side part 402 of the radiation imaging apparatus 10-3. FIG. 6B shows an example of the internal configuration of the radiation imaging apparatus 10-3 in the F-F cross section shown in FIG. 6A. FIGS. 6A and 6B illustrate an XYZ coordinate system corresponding to the XYZ coordinate system shown in FIGS. 1A to 5B. Hereinafter, with reference to FIGS. 6A and 6B, a structure mainly relating to the conductivity between the rear side part 402 and the cover member 203 will be described. In FIGS. 6A and 6B, elements similar to those shown in FIGS. 1A to 5B are denoted by the same reference numerals, and a detailed description thereof is omitted.

Specifically, the radiation imaging apparatus 10-3 according to the third embodiment has a structure corresponding to the radiation imaging apparatus 10-2 according to the second embodiment described above in which an aspect of the cover member 203 is changed so as not to provide the lock mechanism (205-207).

The cover member 203 shown in FIG. 6B is formed of a metal such as an aluminum alloy, and the packing 204 is adhered or adhered by a double-sided tape to the cover member 203. As shown in FIG. 6B, the cover member 203 is provided with a knob portion 203c at the other end opposite to the one end where the pawl portion 203a is provided, and also with a hook portion 203b below the knob portion 203c that hooks the end of the rear side part 402.

In the radiation imaging apparatus 10-3 of the present embodiment, when the cover member 203 is mounted to the rear side part 402, the hook portion 203b is inserted while being deformed from its root by utilizing the elasticity of the metal of the hook portion 203b. When the cover member 203 is removed from the rear side part 402, the locking by the hook portion 203b is released by deforming the hook portion 203b by applying a force to the knob portion 203c in the right direction (−X direction) in FIG. 6B.

Here, in the radiation imaging apparatus 10-3 of the present embodiment, when the cover member 203 is mounted to the rear side part 402, the upper surfaces of the pawl portion 203a and the hook portion 203b are pressed by the end portions of the rear side part 402, and the packing 204 is crushed, thereby ensuring waterproofness. In the present embodiment, as in the second embodiment, the pawl portion 203a receives a reaction force corresponding to a force for crushing the packing 204 in an upward direction (+Z direction), and the rear side part 402 receives a reaction force in a downward direction (−Z direction). Here, the reaction forces R1, r2 and R2 shown in FIG. 6B can be considered to be the same as the reaction forces R1, r2 and R2 shown in FIG. 5B described in the second embodiment, respectively. Then, due to the reaction force of the packing 204 described here, the upper surface 203a1 of the pawl portion 203a, which is the cover conductive portion, and the end portion 4021 of the rear side part 402, which is the housing conductive portion, are pressed into contact with each other, thereby obtaining stable conductivity.

Here, in the present embodiment, the upper surface of the hook portion 203b is formed without coating or the like. In this case, since the upper surface of the hook portion 203b and the end portion of the rear side part 402 are both conductive portions, these conductive portions are brought into contact with each other, and further stable conductivity can be obtained.

In the radiation imaging apparatus 10-3 according to the third embodiment, the end portion 4021 of the rear side part 402, which is the housing conductive portion, and the upper surface 203a1 of the pawl portion 203a, which is the cover conductive portion, are pressed into contact by the reaction force of the packing 204, which is the elastic member. According to this configuration, as in the first and second embodiments, it is possible to realize a simple structure with a small number of parts when preventing the breakage of the internal electric parts due to static electricity and ensuring waterproofness. Furthermore, since the radiation imaging apparatus 10-3 is not provided with the lock mechanism (205-207) in the first and second embodiments, it is possible to satisfy the stable conduction performance and the waterproof performance without requiring additional parts for locking the cover member 203.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-112774, filed Jul. 7, 2021, which is hereby incorporated by reference herein in its entirety.

What is claimed is:

1. A radiation imaging apparatus comprising:
an image conversion unit configured to convert radiation into an electrical signal relating to a radiation image;
a housing arranged to encase the image conversion unit, on which at least one opening is formed and comprising a housing conductive portion at least a part of which is a conductive portion;
a cover member arranged to cover the opening, which is detachably attached to the housing and comprising a cover conductive portion at least a part of which is a conductive portion; and
an elastic member provided between the cover member and the housing,
wherein the housing conductive portion and the cover conductive portion are pressed into contact by a reaction force of the elastic member,
wherein the cover member is formed of a metal and is coated at least partially, and
wherein the cover conductive portion is a portion of the cover member that is not coated.

2. The radiation imaging apparatus according to claim 1, wherein the cover member is formed of an aluminum alloy as the metal.

3. The radiation imaging apparatus according to claim 1, wherein the housing is formed of a metal and is coated at least partially, and
wherein the housing conductive portion is a portion of the housing that is not coated.

4. The radiation imaging apparatus according to claim 3, wherein the housing is formed of a magnesium alloy or an aluminum alloy as the metal.

5. The radiation imaging apparatus according to claim 1, wherein a housing is formed of CFRP and has a three-dimensional structure, and
wherein the housing conductive portion is provided on an end of a vertical wall in the three-dimensional structure.

6. The radiation imaging apparatus according to claim 1, wherein the housing includes an external appearance housing part having an exterior surface and the housing conductive part, and a holding housing part which has a recessed part capable of holding an electric component therein, fixed integrally with the external appearance housing part, and
wherein the elastic member is provided between the cover member and the holding housing part.

7. The radiation imaging apparatus according to claim 6, wherein the electric component is a battery.

8. A radiation imaging apparatus comprising:
an image conversion unit configured to convert radiation into an electrical signal relating to a radiation image;
a housing arranged to encase the image conversion unit, on which at least one opening is formed and comprising a housing conductive portion at least a part of which is a conductive portion;
a cover member arranged to cover the opening, which is detachably attached to the housing and comprising a cover conductive portion at least a part of which is a conductive portion; and
an elastic member provided between the cover member and the housing,
wherein the housing conductive portion and the cover conductive portion are pressed into contact by a reaction force of the elastic member,
wherein the cover conductive portion is provided on one end of the cover member, the radiation imaging apparatus further comprising a locking mechanism disposed at an other end of the cover member opposite to the one end of the cover member and locking the cover member so as to be mounted on the housing by contacting the housing, and
wherein a distance between the cover conductive portion and the elastic member is shorter than a distance between a contact portion of the lock mechanism contacting with the housing and the elastic member.

9. The radiation imaging apparatus according to claim 8, wherein the housing is formed of a metal and is coated at least partially, and
wherein the housing conductive portion is a portion of the housing that is not coated.

10. The radiation imaging apparatus according to claim 9, wherein the housing is formed of a magnesium alloy or an aluminum alloy as the metal.

11. The radiation imaging apparatus according to claim 8, wherein a housing is formed of CFRP and has a three-dimensional structure, and wherein the housing conductive portion is provided on an end of a vertical wall in the three-dimensional structure.

12. The radiation imaging apparatus according to claim 8, wherein the lock mechanism is formed integrally with the cover member.

13. The radiation imaging apparatus according to claim 8, wherein the housing includes an external appearance housing part having an exterior surface and the housing conductive part, and a holding housing part which has a recessed part capable of holding an electric component therein, fixed integrally with the external appearance housing part, and
wherein the elastic member is provided between the cover member and the holding housing part.

14. A radiation imaging apparatus comprising:
an image conversion unit configured to convert radiation into an electrical signal relating to a radiation image;
a housing arranged to encase the image conversion unit, on which at least one opening is formed and comprising a housing conductive portion at least a part of which is a conductive portion;
a cover member arranged to cover the opening, which is detachably attached to the housing and comprising a cover conductive portion at least a part of which is a conductive portion; and
an elastic member provided between the cover member and the housing,
wherein the housing conductive portion and the cover conductive portion are pressed into contact by a reaction force of the elastic member,
wherein the cover conductive portion is provided on one end of the cover member, the radiation imaging apparatus further comprising a locking mechanism disposed at an other end of the cover member opposite to the one end of the cover member and locking the cover member so as to be mounted on the housing by contacting the housing, and
wherein the locking mechanism is formed of a conductor.

15. The radiation imaging apparatus according to claim 14, wherein the housing is formed of a metal and is coated at least partially, and
wherein the housing conductive portion is a portion of the housing that is not coated.

16. The radiation imaging apparatus according to claim 15, wherein the housing is formed of a magnesium alloy or an aluminum alloy as the metal.

17. The radiation imaging apparatus according to claim 14, wherein a housing is formed of CFRP and has a three-dimensional structure, and
wherein the housing conductive portion is provided on an end of a vertical wall in the three-dimensional structure.

18. The radiation imaging apparatus according to claim 14, wherein the lock mechanism is formed integrally with the cover member.

19. The radiation imaging apparatus according to claim 14, wherein the housing includes an external appearance housing part having an exterior surface and the housing conductive part, and a holding housing part which has a recessed part capable of holding an electric component therein, fixed integrally with the external appearance housing part, and
wherein the elastic member is provided between the cover member and the holding housing part.

\* \* \* \* \*